Feb. 10, 1931.  W. A. CHRYST  1,792,071
SHOCK ABSORBER
Filed Oct. 1, 1928

Inventor
William A. Chryst
By Spencer, Hardman and Fehr
His Attorneys

Patented Feb. 10, 1931

1,792,071

UNITED STATES PATENT OFFICE

WILLIAM A. CHRYST, OF DAYTON, OHIO, ASSIGNOR, BY MESNE ASSIGNMENTS, TO DELCO PRODUCTS CORPORATION, OF DAYTON, OHIO, A CORPORATION OF DELAWARE

SHOCK ABSORBER

Application filed October 1, 1928. Serial No. 309,583.

This invention relates to improvements in shock absorbers particularly adaptable for use on automotive and other vehicles wherever a frame or body is supported by springs upon the road wheel axles.

It is among the objects of the present invention to provide a shock absorber of simple structure and design adapted to operate effectively to dissipate road shocks by cushioning the approaching and separating movements of the frame and axle of the vehicle.

Further objects and advantages of the present invention will be apparent from the following description, reference being had to the accompanying drawings, wherein a preferred embodiment of one form of the present invention is clearly shown.

Figure 1:
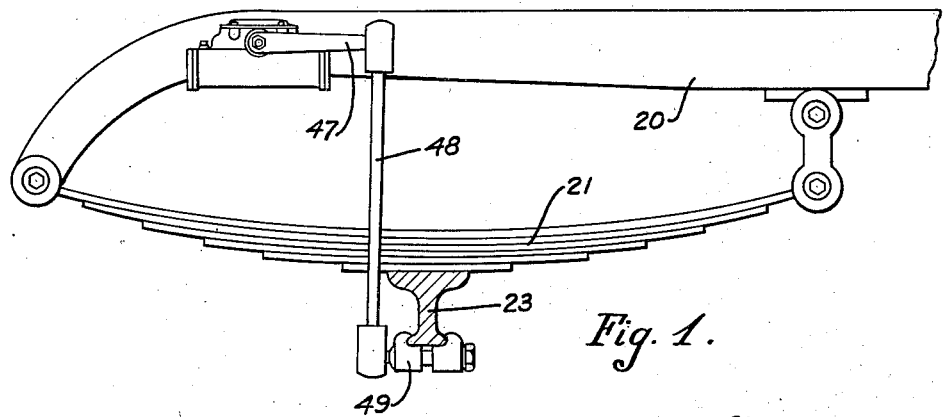
Fig. 1 is a diagrammatic, fragmentary side view showing a portion of the vehicle frame and one axle with one form of the present invention attached thereto.

Referring to the drawings, the numeral 20 designates the frame of the vehicle, having springs 21 (only one of which is shown) attached thereto by which the frame 20 is supported on the axle 23 of the vehicle. The road wheels of the vehicle (not shown) are supported on axle 23.

The shock absorber comprises a casing 24 having apertured lugs 25 for receiving bolts by means of which the shock absorber casing is attached to the frame 20 of the vehicle. The casing 24 provides a cylinder 26, the ends of which are closed by plugs 27 and 28 screw threaded into the cylinder ends, said casing presenting also a fluid chamber 29 communicating with the cylinder 26 substantially intermediate of its ends. A cover plate 30 provided with a gasket 31 is secured to the casing and seals the fluid chamber 29.

Within the cylinder 26 there is provided the fluid displacement member 32 comprising piston portions 33 and 34, the adjacent ends of which are connected together by means of a central web portion 35. The web portion 35 has an opening 36 for receiving the ball-shaped end 37 of the oscillating lever 38. This lever is attached to the knurled portion of the rocker shaft 39 which is journalled in bearings 40 and 41 provided by the shock absorber casing 24. The knurls on the shaft 39 and in the lever 38 prevent relative rotation between said shaft and lever, while the set screw 42 in said lever 38 engages with an annular groove 43 to prevent relative endwise motion between the lever and shaft. A disc 44 seals the open end of bearing portion 40. Packing gland 46 presses a series of packing rings 45 into sealing engagement with the portion of the shaft 39 extending through the bearing portion 41 to the outside of the shock absorber. To the end of shaft 39 extending outside of the shock absorber there is secured one end of the shock absorber operating arm 47, the other end of said arm being swivelly attached to one end of the connecting rod 48, the opposite end of said rod being swivelly secured to a clamp 49 which is anchored to the axle 23.

Casing 24 is provided with by-passages 50 and 51. A passage 52 provides communication between passages 50 and the end of the cylinder 26 having the end cap 27, while the passage 53 provides communication between the passage 51 and the end of the cylinder 26 having the end cover 28. Both passages 50 and 51 terminate in the fluid chamber 29. Passage 52 is normally closed by a valve 54, yieldably held in passage-closing position by a spring 55 interposed between the valve 54 and a screw 56 screw-threaded into the casing. In a similar manner passage 53 is provided with a valve 57 held in passage closing position by spring 58 which is interposed between the valve 57 and the screw 59 threaded to an opening provided in the casing.

Each piston portion 33 and 34 of the fluid displacement member 32 has means for establishing a free flow of fluid from the fluid chamber 29 into the respective cylinder ends in response to the movement of each respective piston portion away from the end of its respective cylinder end. Inasmuch as both of these means are alike, the one provided in piston portion 33 will be described.

The web portion 35 rigidly supports a valve pin 60 so that it is substantially coaxial of the cylinder 26. Upon this valve pin 60, valve 61 is slidably supported, said valve being yieldably maintained by spring 63, in engagement with an annular valve-seat 62 formed integral with the inner wall of piston portion 33. One end of spring 63 engages the valve 61, the other engages the abutment cup 64 held upon the pin 60 by means of a C washer 65. The valve pin 160, valve 161, spring 163, abutment cup 164 and C washer 165 of the piston portion 34 are exactly like the corresponding parts of piston portion 33, the pin 160 however being supported by the web portion 35 so as to be oppositely disposed from the pin 60.

Figure 2:
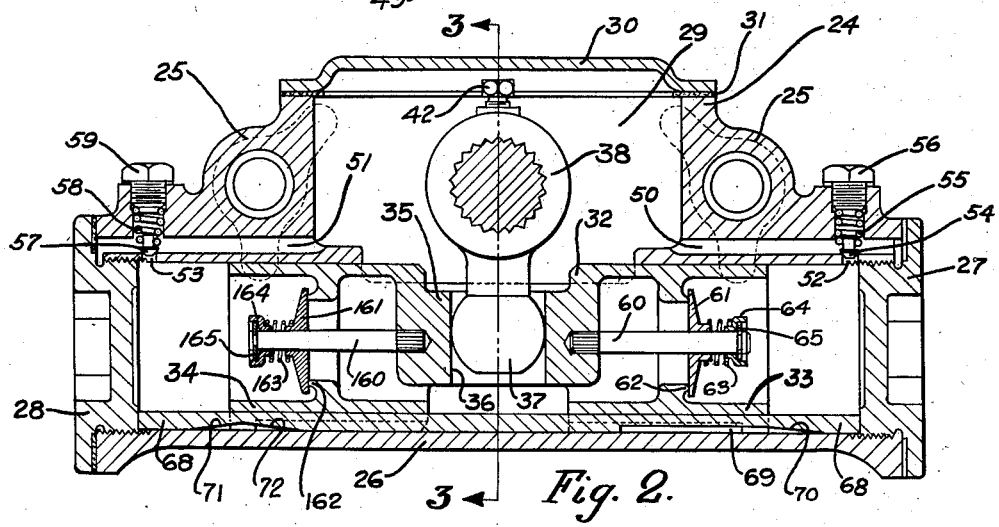
Fig. 2 is a longitudinal sectional view of the shock absorber shown in Fig. 1.
Figures 3, 4:
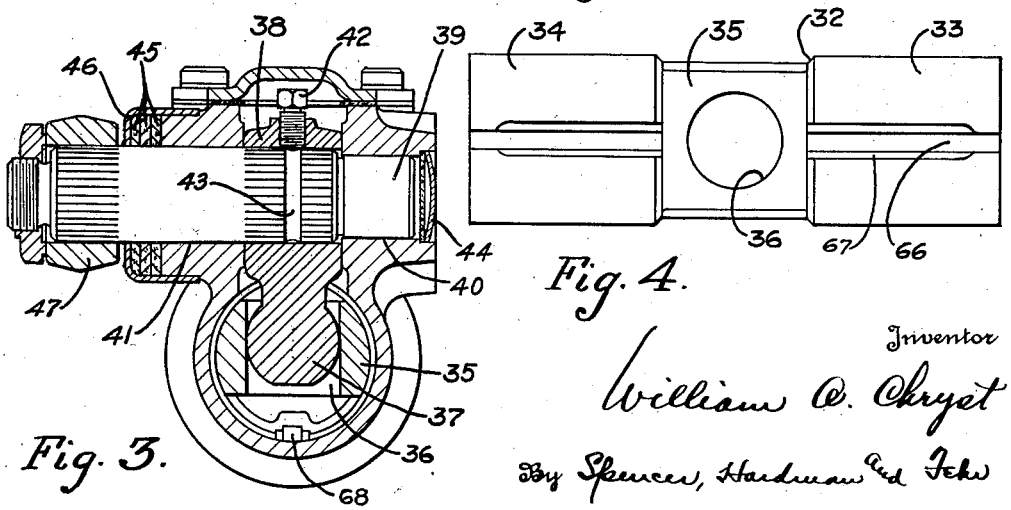
Fig. 3 is a fragmentary transverse sectional view taken on the line 3—3 of Fig. 2.
Fig. 4 is a detailed view of the fluid displacement member of the device.

The fluid displacement member 32 comprising piston portions 33 and 34 and the connecting web portion 35, is provided with a longitudinal groove or slot 66 extending from one end of the said member to the other, throughout its length. Coinciding with slot 66 is an enlarged cut-away portion 67 which terminates short of each end of the displacement member 32 so that at each end of said displacement member the groove therein is substantially the width of the slot 66 as shown in the Fig. 4. Within the cylinder 26 there is provided a metering pin 68 extending from one end of the cylinder to the other, said metering pin 68 being of a width slightly less than the width of slot 66 in the fluid displacement member so that the fluid displacement member slidably fits over the metering pin 68. Metering pin 68 has a recess 69 adjacent its one end, so positioned that said recess 69 is located adjacent the outer end of piston portion 33 when the fluid displacement member is in normal position as shown in Fig. 2. One end of the recess 69 has a surface sloping toward the cylinder wall as indicated at 70, the point of said sloping surface 70 being most remote from the cylinder wall is substantially in alignment with the end of piston portion 33 when said piston portion is in normal position as shown in Fig. 2. Adjacent the other end of the metering pin 68 there is provided a recess having converging sloping surfaces 71 and 72, the widest part of this recess being substantially adjacent the end of piston portion 34 when said piston portion 34 is in a normal position as shown in Fig. 2. The orifices provided by the recesses in metering pin 68 and controlled by the piston portions 33 and 34 provide means for establishing a restricted flow of fluid from either cylinder end to the fluid chamber in response to the movement of either piston portion toward its respective cylinder end.

When the wheels of the vehicle strike an obstruction in the roadway, spring 21 is flexed toward the frame 20, and in so flexing the connecting rod 48 and operating arm 47 will move the shaft 39 in a counter-clockwise direction, thus lever 38 will move the fluid displacement member 32 to the right as regards Fig. 2. In this case fluid from the fluid chamber 29 flowing through the space about the connecting web portion 35, will exert a pressure upon the valve 161 to move it from its valve seat 162 and thus establish a free flow of fluid from the fluid chamber into the left cylinder chamber. Movement of the fluid displacement member 32 toward the right will cause the piston portion 33 to exert a pressure upon the fluid in the right chamber of the cylinder 26, causing the fluid to flow through the orifice formed by the sloping surface 70 of pin 68, the inner wall of the cylinder and the piston slot 66 thereby providing a restricted flow of fluid through said orifice back to the fluid chamber 29. In the normal position as shown in Fig. 2 this orifice will be of a certain size; however, as the piston moves toward the right or over the receding surface 70 which slopes toward the cylinder wall, this orifice will gradually be decreased and thus the fluid flow will gradually, increasingly be restricted. Such gradual increase of restriction to the fluid flow from the right portion of cylinder 26 affords a resistance to the movement of the fluid displacement member 32 toward the right and consequently restricts the flexing movement of spring 21 gradually increasingly. As soon as the flexing of spring 21 ceases, it immediately tends to return to its normal position by a rebounding movement, thus tending suddenly to move the arm 47 to rotate the shaft 39 in a clockwise direction. In this instance a free flow of fluid from the fluid chamber 29 past valve 61 into the right end of cylinder 26 will be established. At the same time piston 34 will have its valve 161 seated tightly upon its seat 62, said piston portion then exerting a pressure upon the fluid within its cylinder, causing a resistance to the movement of the piston and and thus resisting the return movement of spring 21 toward its normal position. In moving the fluid displacement member 32 toward the right due to the striking of an obstruction, piston portion 34 will have moved away from the recess including the sloping surface 71 and 72, so that the end of piston portion 34 will lie adjacent the point where surface 72 meets the cylinder wall surface, and thus at first a very slight orifice is presented by said recess, thereby providing a substantially high restriction to the return flow of fluid from the left end of the cylinder 26 to the fluid chamber 29. However as the piston portion 34 begins to move toward the left in response to the effort of spring 21 to return to normal position, the orifice presented by sloping surface 72 and the piston portion 34 will gradually be increased, such increase continuing until the piston has reached the normal position as shown in Fig. 2. Continued movement from this normal position toward the left will gradually decrease the orifice presented by the sloping surface 71 and the piston portion 34. Thus it may be seen that during the movement of the piston portion 34 toward the left by the unflexing movement of spring 21, a substantially high resistance is at first offered which is gradually decreased to a certain point of piston travel, then continued movement of the piston from this point to the left causes a gradual increase in resistance.

Spring loaded valves 54 and 57 controlling passages 52 and 53 communicating with the right and left ends respectively of cylinder 26 are effective to relieve fluid pressure within the respective ends of the cylinders only when said fluid pressures exceed a predetermined value, so that said valves may be termed safety valves, acting only at a predetermined high fluid pressure.

From the aforegoing it may be seen that applicant has provided a shock absorber which gradually and increasingly restricts the movement of the spring 21 as it is flexed due to the wheels of the vehicle striking obstructions in the roadway, said shock absorber preventing jolts and jars from being transmitted to the vehicle body, generally caused by rebounding of the spring, by first greatly resisting the return movement of the spring toward its normal position, gradually decreasing the resistance offered to the spring return and at a predetermined point, or substantially at the normal position of the spring, providing means which will gradually and increasingly resist the continued movement of the spring 21 beyond its normal unflexed position.

While the form of embodiment of the present invention as herein disclosed, constitutes a preferred form, it is to be understood that other forms might be adopted, all coming within the scope of the claims which follow.

What is claimed is as follows:

1. A shock absorber comprising in combination, a casing presenting a cylinder closed at both ends and a fluid chamber communicating with said cylinder substantially intermediate the ends thereof; a fluid displacement member in the cylinder, having a longitudinal groove in its outer surface; means for reciprocating said member; means for establishing a free flow of fluid from the fluid chamber into the cylinder spaces on one side of the displacement member or the other in response to the movement of said member toward the opposite end of the cylinder respectively; means providing for a restricted flow of fluid from one end of the cylinder or the other in response to movement of the fluid displacement member toward either of said cylinder ends respectively, said means comprising a metering pin in the cylinder, slidably fitting into the longitudinal groove of the fluid displacement member, said pin having recesses cooperating with said member to control the fluid flow from the cylinder ends in accordance with the direction of movement and the position of said member relative to the cylinder, said means also comprising valved passages providing communication between the respective cylinder ends and the fluid chamber.

2. A shock absorber comprising in combination, a casing presenting a cylinder closed at both ends and a fluid chamber communicating with said cylinder, substantially intermediate the ends thereof; a fluid displacement member in the cylinder, having a longitudinal groove in its outer surface; means for reciprocating said member; means for establishing a free flow of fluid from the fluid chamber into the cylinder spaces on one side of the displacement member or the other in response to the movement of said member toward either of the opposite ends of the cylinder respectively; means providing for a restricted flow of fluid from one end of the cylinder or the other in response to movement of the fluid displacement member toward either of said cylinder ends respectively, said means comprising a metering pin in the cylinder, slidably fitting into the longitudinal groove of the fluid displacement member and engaging the cylinder wall, said pin having recesses on the side adjacent the cylinder wall cooperating with said member, one of said recesses cooperating with one end of the displacement member having its end adjacent the end of the cylinder, provided with a wall inclined relative to the wall of the cylinder, the other end thereof being substantially parallel to the wall of the cylinder, the other recess cooperating with the other end of the displacement member and having its bottom wall surface sloping divergingly from a central point toward the wall of the cylinder.

3. A shock absorber comprising in combination, a casing presenting a cylinder closed at both ends and a fluid chamber communicating with said cylinder substantially intermediate the ends thereof; a fluid displacement member in the cylinder, having a longitudinal groove in its outer surface; means for reciprocating said member; means for establishing a free flow of fluid from the fluid chamber into the cylinder spaces on one side of the displacement member or the other in response to the movement of said member toward the opposite end of the cylinder respectively; means providing for a restricted flow of fluid from one end of the cylinder or the other in response to movement of the fluid displacement member toward either of said cylinder ends respectively, said means comprising a metering pin in the cylinder, slidably fitting into the longitudinal groove of the fluid displacement member, said pin having recesses cooperating with said member to control the fluid flow from the cylinder ends in accordance with the direction of movement and the position of said member relative to the cylinder, said means also comprising passages providing communication between the respective cylinder end chambers and the fluid chamber, each passage having a normally closed, spring-loaded valve, adapted to be opened only when the pressures in said end chambers exceed a predetermined value.

4. A shock absorber comprising in combination, a casing presenting a cylinder having both ends closed and a fluid chamber communicating with said cylinder substantially intermediate its ends; a fluid displacement member in said cylinder, said member comprising two piston portions connected by a central web portion; means oscillatably supported within the fluid chamber and engaging said web portion for reciprocating the fluid displacement member; a valve in each piston portion adapted to establish a free flow of fluid from the fluid chamber into the respective ends of the cylinder in response to the movement of the piston portions away from their respective cylinder ends, each valve comprising a valve stem rigidly supported in the central web portion of the fluid displacement member so as to be substantially coaxial of the cylinder; and means comprising a recessed metering pin in the cylinder, slidably fitting into aligned, longitudinal passages in the outer walls of the piston portions for establishing a restricted flow of fluid from each cylinder end to the fluid chamber in response to the movement of the piston portions toward their respective cylinder ends.

In testimony whereof I hereto affix my signature.

WILLIAM A. CHRYST.